United States Patent [19]

Suto et al.

[11] Patent Number: 4,746,787

[45] Date of Patent: May 24, 1988

[54] IC CARD WITH DISPLAY AND CARD RECORDING AND READING DEVICE

[75] Inventors: Shin-ichi Suto; Toshihiko Okada, both of Tokyo, Japan

[73] Assignee: Oki Electric Industry Co., Ltd., Tokyo, Japan

[21] Appl. No.: 756,082

[22] Filed: Jul. 17, 1985

[30] Foreign Application Priority Data

Jul. 20, 1984 [JP] Japan .................................. 59-149386
Jul. 27, 1984 [JP] Japan .................................. 59-155495

[51] Int. Cl.<sup>4</sup> ............................................. G06K 19/00
[52] U.S. Cl. ........................................ 235/379; 235/380
[58] Field of Search ................................ 235/379, 380

[56] References Cited

U.S. PATENT DOCUMENTS

| | | |
|---|---|---|
| 3,702,464 | 9/1972 | Castrucci . |
| 3,971,916 | 7/1976 | Moreno . |
| 4,007,355 | 2/1977 | Moreno . |
| 4,092,524 | 5/1978 | Moreno ............................. 235/380 |
| 4,277,837 | 7/1981 | Stuckert ......................... 235/379 X |
| 4,298,793 | 11/1981 | Melis ................................. 235/380 |
| 4,582,985 | 4/1986 | Loeberg .......................... 235/389 X |

FOREIGN PATENT DOCUMENTS

| | | |
|---|---|---|
| 5577090 | 4/1978 | Japan . |
| WO83/03018 | 9/1983 | PCT Int'l Appl. . |
| WO83/03694 | 10/1983 | PCT Int'l Appl. . |
| 2066540 | 8/1981 | United Kingdom . |
| 2130412 | 5/1984 | United Kingdom . |

OTHER PUBLICATIONS

IEEE Spectrum, Computer Reliability, Centennial Art, Feb. 1984, The Institute of Electrical and Electronics Engineers, Inc., pp. 43–49.

*Primary Examiner*—Harold I. Pitts
*Attorney, Agent, or Firm*—Wenderoth, Lind & Ponack

[57] ABSTRACT

An IC card includes an integrated circuit composed of a transmitter/receiver, a processor, a memory, and a display controller, a display, and control switches for successively switching data displayed on the display. Desired data stored in the memory can be displayed on the display by a command delivered through the transmitter/receiver or by actuation of the control switches. An IC card reader for reading the IC card includes signal transmitting and receiving circuits for transmitting signals to and receiving signals from the IC card, and a control unit for displaying the stored data on the display of the IC card in dependance upon the processed results.

3 Claims, 12 Drawing Sheets

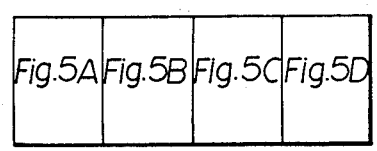
*Fig. 5A*
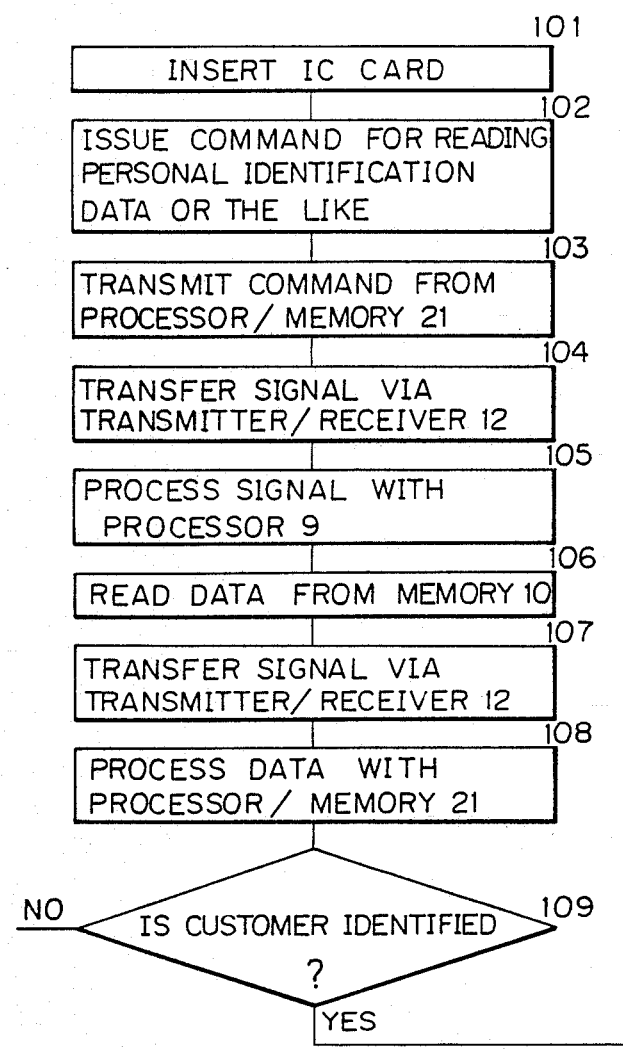

IC CARD WITH DISPLAY AND CARD RECORDING AND READING DEVICE

BACKGROUND OF THE INVENTION

1. Field of the Invention

The present invention relates to an information card having a semiconductor IC encapsulated in an insulating plastic substrate for use as a validation card, an admission checking card, a credit card, or the like in business transactions and personal identification, and more particularly to an IC card having a display capability and an IC card reader for reading recorded information from such an IC card.

2. Description of the Related Art

Automatic cash dispensing and depositing machines in banks and other monetary organizations are operated to dispense or deposit bank notes by cash cards inserted by the customers who enter necessary input data into the machine. The details of the transaction are recorded on a slip issued from the machine or on the passbook which is inserted by the customer into the machine.

The conventional automatic cash dispensing and depositing machines are however disadvantageous in that the customers are required to handle three different mediums, i.e., the cash card, the bank note, and the slip or passbook, independently or in combination, a process which has been complex to make in connection with the machine.

The automatic cash dispensing and depositing machine is required to have a cash dispensing and depositing ability, an ability to read data from the magnetic stripes on cash cards, an ability to print transaction details on slips and issue them, and an ability to print transaction details on passbooks. Therefore, the machine has been complicated in structure and expensive to manufacture.

There have recently been proposed IC cards and IC card readers, the IC card being composed of a semiconductor IC including a data processing circuit and a memory circuit and encapsulated in a insulating card substrate. However, the proposed IC cards and IC card readers have not yet been successful in solving the aforesaid problems.

SUMMARY OF THE INVENTION

It is an object of the present invention to provide an IC card having a business transaction capability, a personal identification capability, a data recording and reading capability, and a data displaying ability for simplifying a process which is needed to operate a machine such as an automatic cash dispensing and depositing machine.

Another object of the present invention to provide an IC card reader designed to reduce the cost of manufacture of a machine such as an automatic cash dispensing and depositing machine in which the IC card reader is incorporated.

To achieve the above objects, an IC card includes an integrated circuit composed of a transmitter/receiver, a processor, a memory, and a display controller, a display, and control switches for successive switching of the display.

Data items can be stored in the memory through the transmitter/receiver and the processor, and read out of the memory through the transmitter/receiver and the processor. Desired data which is stored in the memory can be displayed on the display by a command given through the transmitter/receiver, or operation of the control switches.

The above objects can also be achieved by an IC card having a transmitting means and a receiving means which are electrically or optically coupled respectively to the receiver and transmitter, respectively, of an IC card reader, a transmitter/receiver for transmitting data to and receiving data from the IC card reader through the transmitting and receiving means, a processor for processing the data, a memory for storing the data, a display for displaying the data stored in he memory, control switches and a display controller for processing the data stored in the memory so as to display the data on the display, and a power supply means. The IC card reader also includes a processor/memory for recording the data in and reading the data from the IC card through the transmitter/receiver, and a means for controlling the stored data to be displayed on the display of the IC card dependent on the processed result.

Data items can be read from the memory of the IC card through the transmitter/receiver and the processor by means of the processor/memory of the IC card reader, and can be stored into the memory of the IC card through the transmitter/receiver and the processor by means of the processor/memory of the IC card reader. Desired data can be dispoloayed on the display through the display controller by means of the processor/memory and the control switches.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
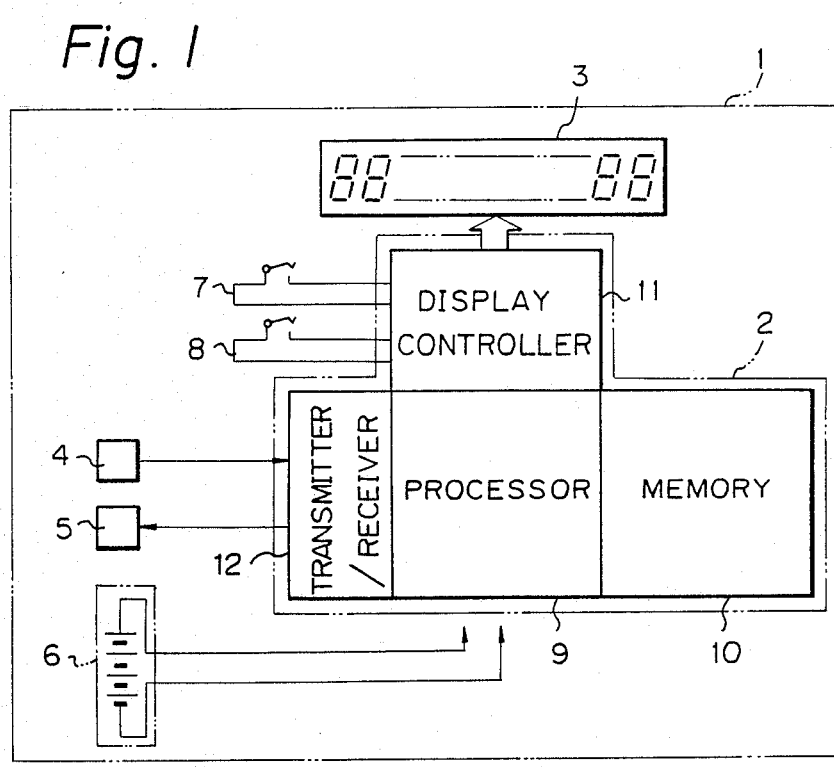
FIG. 1 is a block diagram of the circuit arrangement of an IC card according to the present invention.

As shown in FIG. 1, an IC card 1 is composed of an insulating plastic substrate and various circuit components, described below, encapsulated in the insulating plastic substrate.

An integrated circuit 2 encapsulated in the substrate includes electronic circuits such as a processor and signal processing circuits, as described later on.

A liquid crystal display 3 is encapsulated in the substrate. A signal receiving means 4 is capable of receiving signals from an external device such as an IC card reader (described below). A signal transmitting means 5 is capable of transmitting signals to the IC card reader. A power supply means 6 supplies electric power to the integrated circuit 2, the display 3, and the signal transmitting means 5 for their operation. Control switches 7 and 8 are also encapsulated in the substrate for generating signals upon depression.

The integrated circuit 2 includes a processor 9 for executing commands and processing data, a memory 10 for storing a program which sequentially operates the processor 9 and processed data and data to be displayed, a display controller 11 for delivering signals from the control switches 7 and 8 to the processor 9 and controlling the data displayed on the display 3 under the command from the processor 9, and a transmitter/receiver 12 for converting serial data from the external device through the signal receiving means 4 to parallel data and delivering the parallel data to the processor 9, and for converting parallel data from the processor 9 to serial data and transmitting the serial data to the external device through the signal tranmitting means 5.

Figure 2:
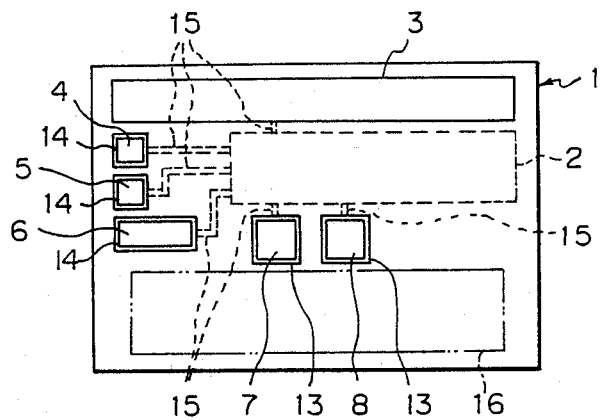
FIG. 2 is a plan view of the IC card of the invention.

In FIG. 2, the control switches 7 and 8 comprise members which can be operated in response to depression in a direction perpendicular to the surface of the IC card 1, the control switches 7 and 8 being protected by protective sheets 13 and 13 disposed over the IC card 1. The signal receiving means 4, the signal transmitting means 5, and the power supply means 6 are protected by thin transparent sheets 14 of glass disposed over the IC card 1. The integrated circuit 2 is electrically connected by conductors 15 to the display 3, the signal receiving means 4, the signal transmitting means 5, the power supply means 6, and the control switches 7 and 8. The IC card 1 also includes an embossed area 16 where embossed numbers and names are indicated.

Figure 3:
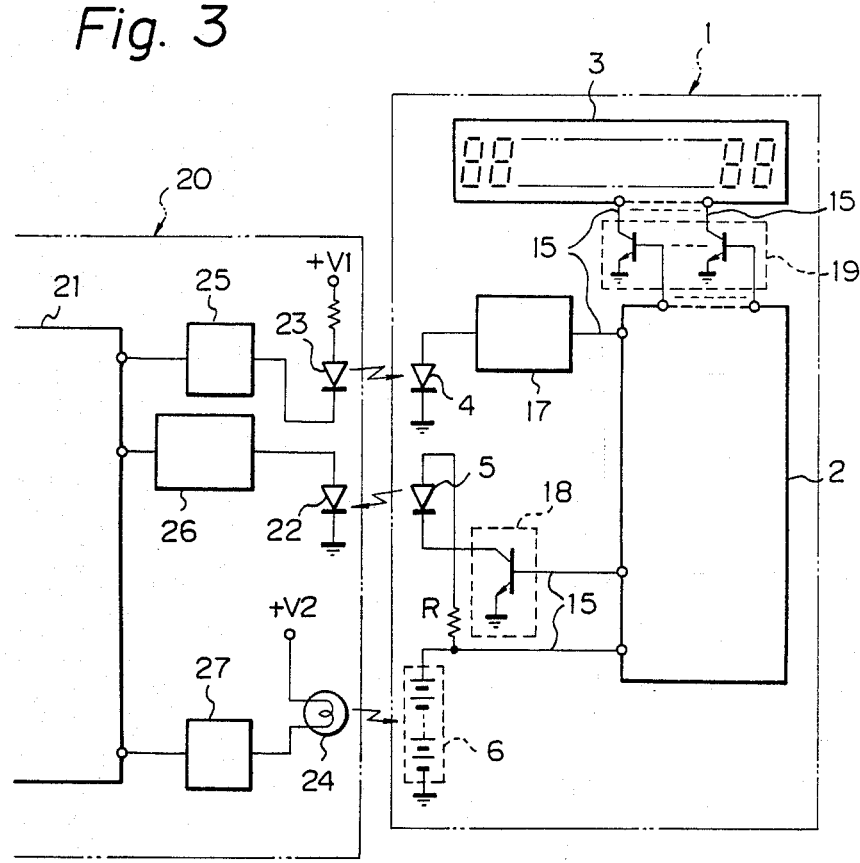
FIG. 3 is a block diagram of the IC card as set in an IC card reader according to the present invention.

As illustrated in FIG. 3, a received-signal converter 17 is connected between the signal receiving means 4 and the integrated circuit 2 for converting signals from the signal receiving means 4 to logic signals through amplification and A/D conversion, and delivering the logic signals to the integrated circuit 2. A driver 18 is connected between the integrated circuit 2 and the signal transmitting means 5 for driving the signal transmitting means 5 for driving the signal transmitting means 5 with signals from the integrated circuit 2. Another driver 19 is connected between the integrated circuit 2 and the display 3 for driving the display 3 under the command from the integrated circuit 2.

An IC card reader 20 includes a processor/memory 21, a receiver 22 positioned in a confronting relationship to the signal transmitting means 5 of the IC card 1 relative to the IC card reader 20, a transmitter 23 positioned in a confronting relationship to the signal receiving means 4 of the IC card 1 relative to the IC card reader 20, and a light source 24 positioned in a confronting relationship to the power supply means 6 of the IC card 1 relative to the Ic card reader 20. The IC card reader 20 also has a driver 25 for driving the transmitter 23 with signals from the processor/memory 21, a received-signal converter 26 connected between the processor/memory 21 and the receiver 22 for converting signals from the receiver 22 to logic signals by way of amplification and A/D conversion and delivering the logic signals to the processor/memory 21, and a driver 27 connected between the processor/memory 21, and the light source 24 for driving the light source 24 under the command of the processor/memory 21.

The signal receiving means 4 and the receiver 22 comprise light detectors, and the signal transmitting means 5 and the transmitter 23 comprise light-emitting devices for optical transmission of signals. Alternatively, the signal receiving means 4, the receiver 22, the signal transmitting means 5, and the transmitter 23 may comprise members which can electrically contact each other for signal transmission. The power supply means 6 of the IC card 1 comprises a photocell supplied with electric energy from the IC card reader 20 or another external device. However, the power supply means 6 may instead be composed of an independent, self-energizable power supply unit. The signal receiving means 4, the signal transmitting means 5, and the power supply means 6 are disposed in an optically isolated relationship to each other, and likewise the transmitter 23, the receiver 22, and the light source 24 are also disposed in an optically isolated relationship to each other. The received-signal converter 17, the driver 18, and the driver 19 are omitted from illustration in FIG. 1.

Figure 4:
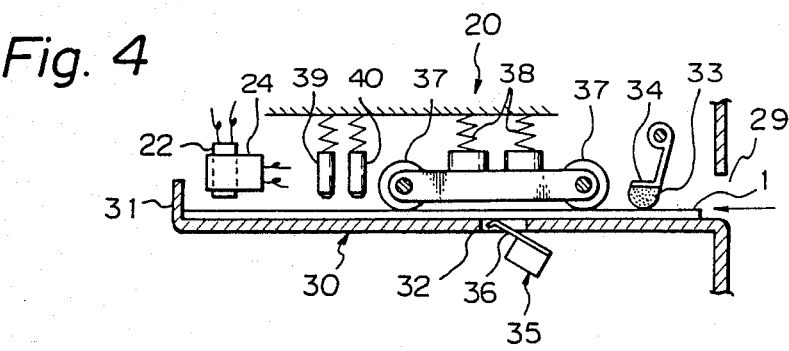
FIG. 4 is a sectional side elvational view of the IC card reader of the invention.

As illustrated in FIG. 4, the IC card reader 20 has a card insertion slot 29 defined in the front panel thereof. A card passage 30 has on a terminal end thereof a card stopper 31 bent upwardly for stopping the IC card 1 in a prescribed position in the card passage 30, the card passage 30 having an intermediate hole 32. A cleaning member 33 is disposed in the vicinity of the card insertion slot 29 and urged by a spring 34 for resiliently contacting the surface of the IC card 1 under a suitable pressure.

A microswitch 36 has a lever 36 projecting partly through the hole 32 into the card passage 30. The microswitch 36 is energized by the IC card 1 inserted into the card passage 30 and operating the lever 36. Pressure rollers 37 are positioned above the microswitch 35 and resiliently biased by springs 38 for pressing the inserted IC card 1 against the bottom of the card passage 30. Presser levers 39 and 40 are positioned in a confronting relationship to the control switch 7 and 8, respectively, of the IC card 1 set in the IC card reader 20 for automatically depressing the control switches 7 and 8 for switching the data displayed on the display 3 of the IC card 1.

Figure 5B:
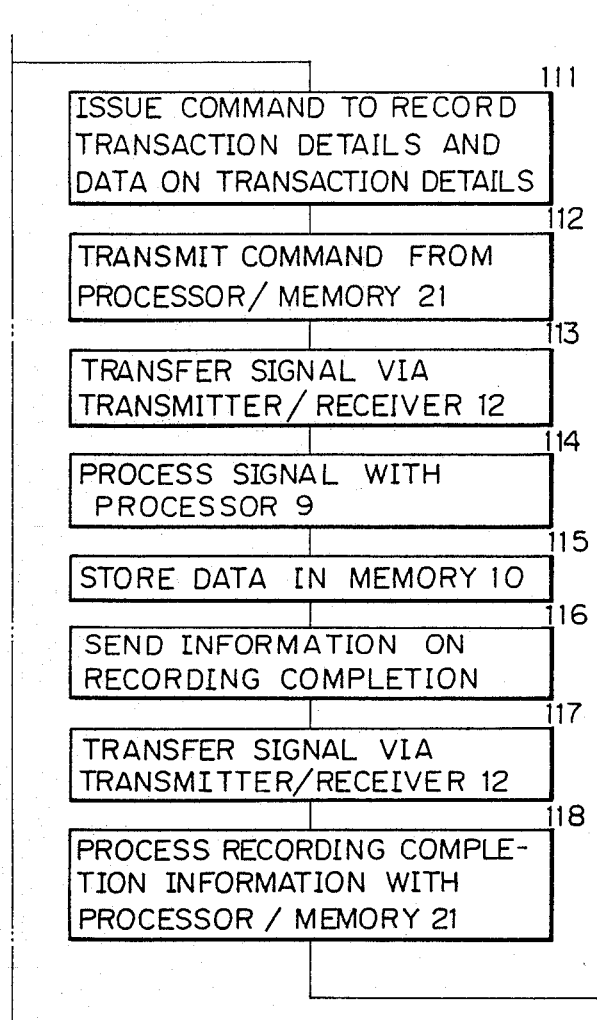
FIG. 5, consisting of FIGS. 5A-5D, is a flowchart of cash dispensing operation carried out by the IC card and the IC card reader.
Figure 5C:
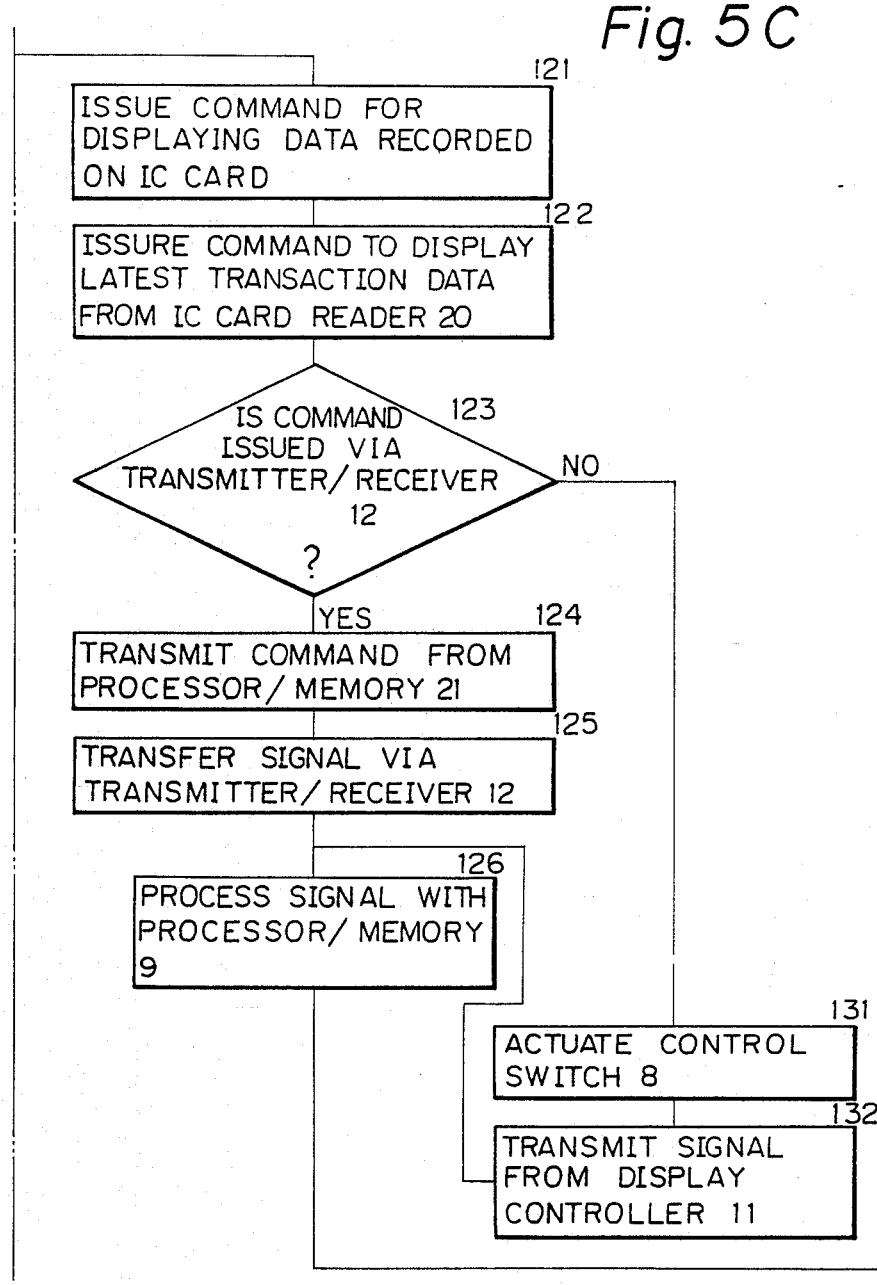
Figure 5D:
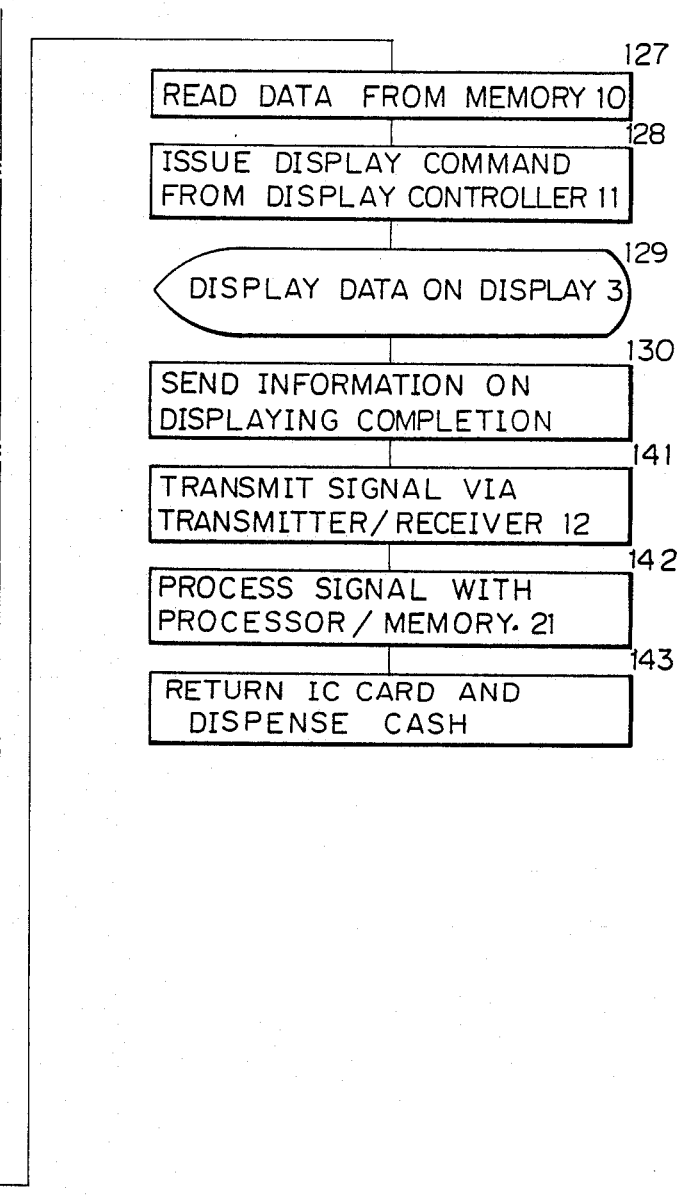

Operation of the IC card 1 and the IC card reader 20 will be described with reference to FIG. 5.

Customer indentification

A customer inserts his IC card 1 into the IC card reader 20 through the card insertion slot 29 for receiving a desired amount of money from an automatic cash dispensing and depositing machine associated with the IC card reader 20. In the IC card reader 20, the cleaning member 33 cleans the surface of the IC card 1, especially where the signal receiving means 4, the signal, transmitting means 5, and the power supply means 6 are located. The IC card 1 is set in position, in a step 101, upon engagement by the card stopper 31 of the card passage 31 as shown in FIG. 4. The processor/memory 21 then receives a set signal from a detector (not shown) and transmits a command signal for reading personal indentification data from the memory 10 of the IC card 1 as an optical signal through the driver 25 and the transmitter 23 to the signal receiving means 4 of the IC card 1, in steps 102, 103.

When the transmitted opetical signal is received by the signal receiving means 4 of the IC card 1, the optical signal, is converted by the received-signal converter 17 to a logic signal which is fed to the transmitter/receiver 12. The transmitter/receiver 12 converts serial data indicated by the logic signal to parallel data, and delivers the same as a data readout command from the IC card reader 20 to the processor 9 in a step 104.

The processor 9 successively processes the parallel data and judges the same as the data readout command for reading the personal indentification data in a step 105. The processor 9 then reads necessary data from the addresses of the memory 10 where the personal indentification data is stored, in a step 106, and sets the readout data as transmission data in the transmitter/receiver 12. The transmission data or parallel data is converted by the transmitter/receiver 12 to serial data which is transmitted as an optical signal through the driver 18 and the signal transmitting means 5 to the receiver 22 of the IC card reader 20 in a step 107.

When the data is received as an optical signal by the receiver 22, the optical signal is converted by the received-signal converter 26 to a logic signal which is then fed to the processor/memory 21. The processor/memory 21 successively processes data in the form of the received logic signal, and transfers the processed data to the controller of the automatic cash dispensing and depositing machine (not shown) in a step 108.

The automatic cash dispensing and depositing machine compares the processed data, i.e., the personal indentification data with the customer's code number entered through another means by the customer. If the data and the customer's code number coincide and the depositing conditions are met, then the automatic cash dispensing and depositing machines dispenses the amount of money which the customer has specified through another means in a step 109.

Recording of transaction details

When the cash dispensing transaction is established, the automatic cashing dispensing and depositing machine issues a command for recording transaction details and data on the transaction details to the IC card reader 20 in a step 111.

In response to the output signal from the automatic cash dispensing and depositing machine, the processor/memory 21 of the IC card reader 20 transmits an optical signal through the driver 25 and the transmitter 23 to the signal receiving means 4 of the IC card 1, thus delivering the recording command and the transaction details data to the IC card 1 in a step 112.

The transaction details data received by the IC card 1 is stored through the received-signal converter 17, the transmitter/receiver 12, and the processor 9 into addresses in the memory 10 which are reserved for writing latest data therein, in steps 113, and 114, 115. Information indicating that the transaction details data has been recorded is then transmitted via the transmitter/receiver 12, the driver 18, and the signal transmitting means 5 to the receiver 22 of the IC card reader 20 in steps 116, 117 and 118.

Display of transaction details

When the information indicating the completion of data recording is received from the receiver 22 through the received-signal converter 26 and the processor/memory 21, a command for displaying the latest transaction details is issued from the processor/memory 21 through the driver 25 and the transmitter 23 to the signal receiving means 4 of the IC card 1 in steps 121, 122 and 124.

When the commond for displaying the latest transaction details is received by the IC card 1 from the signal receiving means 4 through the received-signal converter 17 and the transmitter/receiver 12 in steps 125 125 and 126, the processor 9 reads the latest data of transaction details out of the addresses thereof in the memory 10 in a step 127, and transfers the data to the display controller 11 in a step 128. The display controller 11 displays the latest data on the display 8 through the driver 19 in a step 129.

Instead of delivering the command for displaying the latest transaction details through the signal receiving means 4 of the IC card 1 in the steps 123, 124 and 125, the presser lever 40 (FIG. 4) of the IC card reader 20 may be actuated to depress the control switch 8 in steps 131 and 132 to enable the processor 9 to read the latest transaction details data from the addresses of the memory 10. Then, the data is transferred to the display controller 11 in the step 126, 127 and 128. The display controller 11 displays the latest data on the display 8 through the driver 19 in the step 129.

Therefore, the stored data to be displayed on the display 3 of the IC card 1 under the command of the IC card reader 20 may be controlled by either the means which transmits the command from the processor/memory 2 via the driver 25 and the transmitter 23 or the means which actuates the presser lever 40 under the control of the processor/memory 21.

After the latest transaction details data is displayed, information indicating the completion of display is transmitted from the transmitter/receiver 12 through the driver 18 and the signal transmitting measn 5 to the receiver 22 of the IC card reader 20 in a step 141. The receiver 22 then delivers the received information through the received-signal converter 26 to the processor/memory 21, which transfers the display completion information to the controller of the automatic cash dispensing and depositing machine in a step 142. In response to the display completion information, the automatic cash dispensing and depositing machine issues a command from its controller to return the IC card 1 and dispenses the card in a step 143.

The customer receives the cash and the IC card 1, and can confirm the latest transaction details by looking at the display 3 of the IC card 1.

Figure 6A:
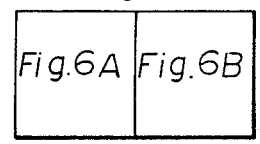
FIG. 6, consisting of FIGS. 6A-6B, is a block diagram of the integrated circuit of an IC card according to another embodiment of the present invention, the view showing the manner in which data stored in the IC card is successively displayed.
Figure 6:
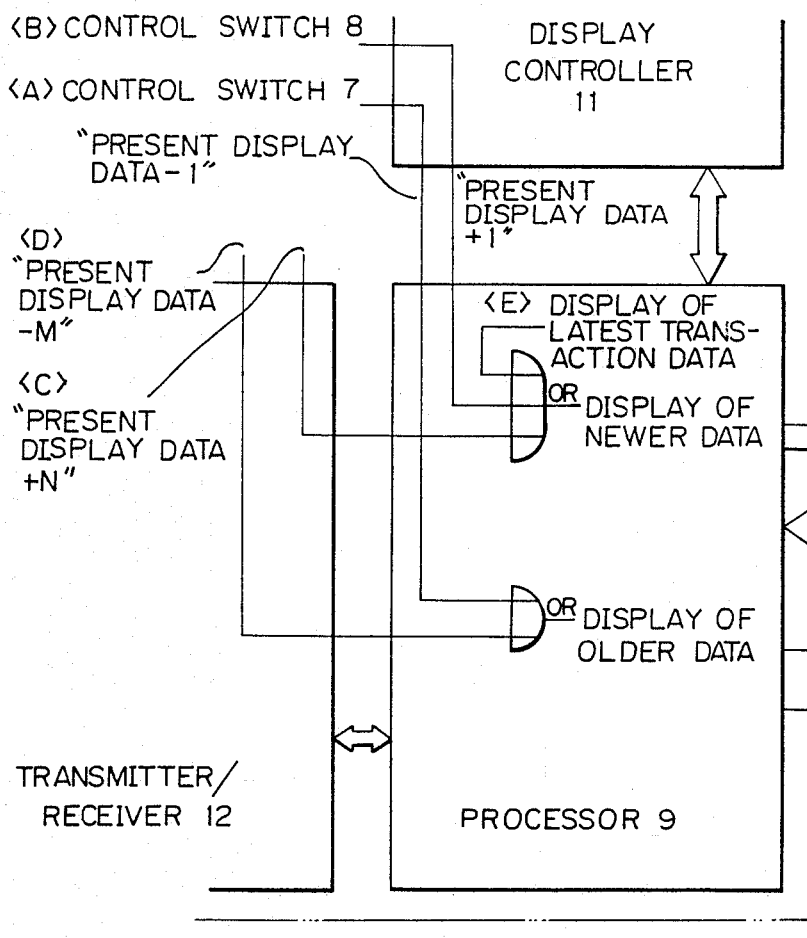
Figure 6B:
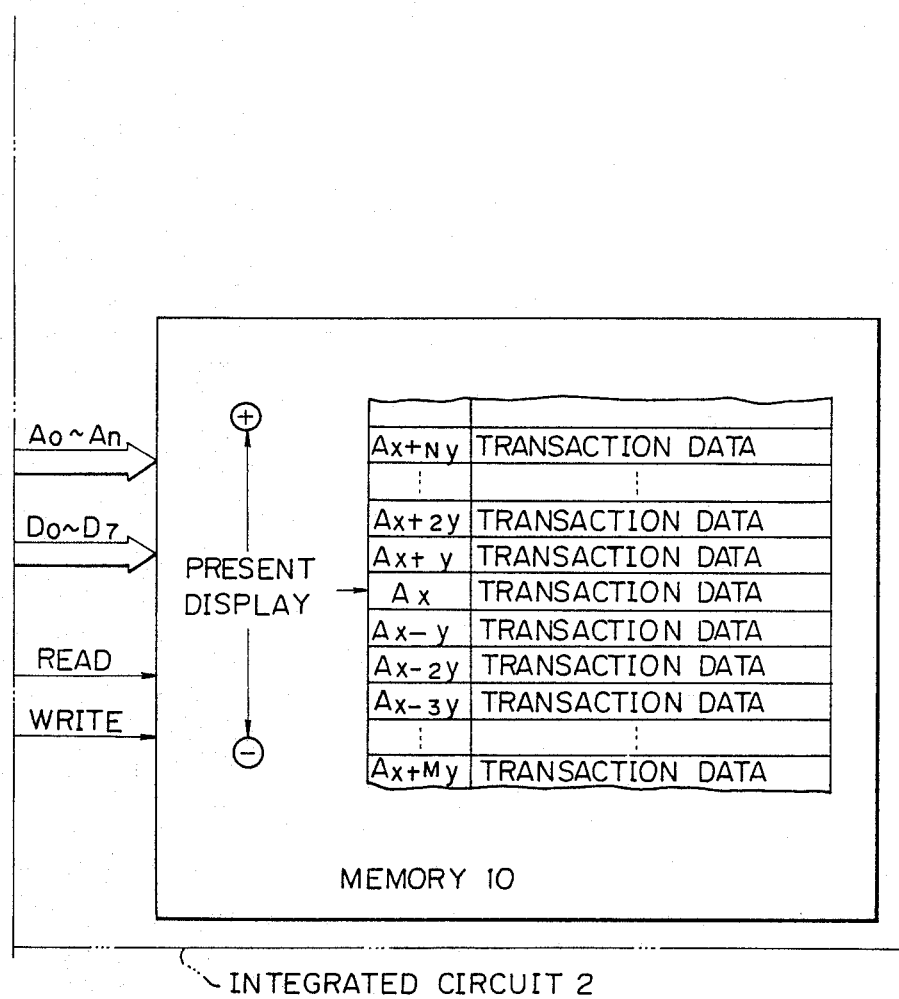
Figure 7A:
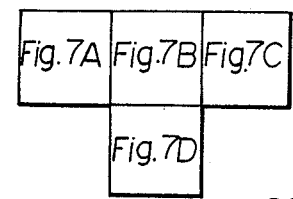
FIG. 7, consisting of FIGS. 7A-7D, is a flowchart of operation of the IC card shown in FIG. 6.
Figure 7A:
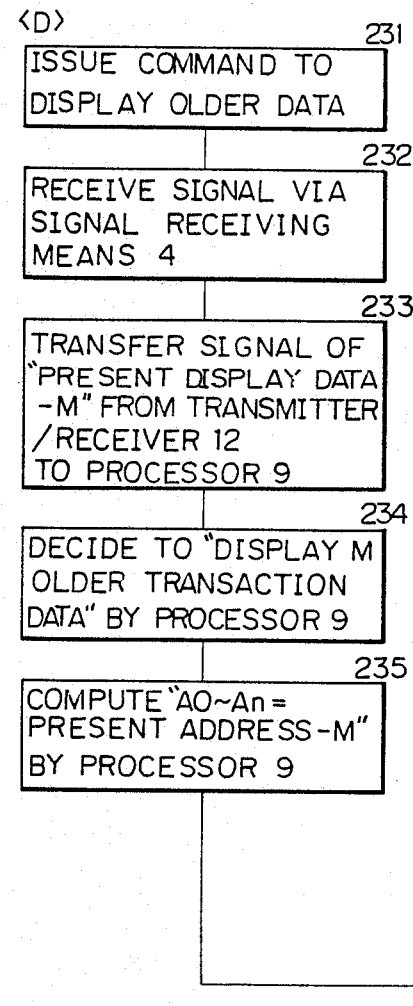
Figure 7A:
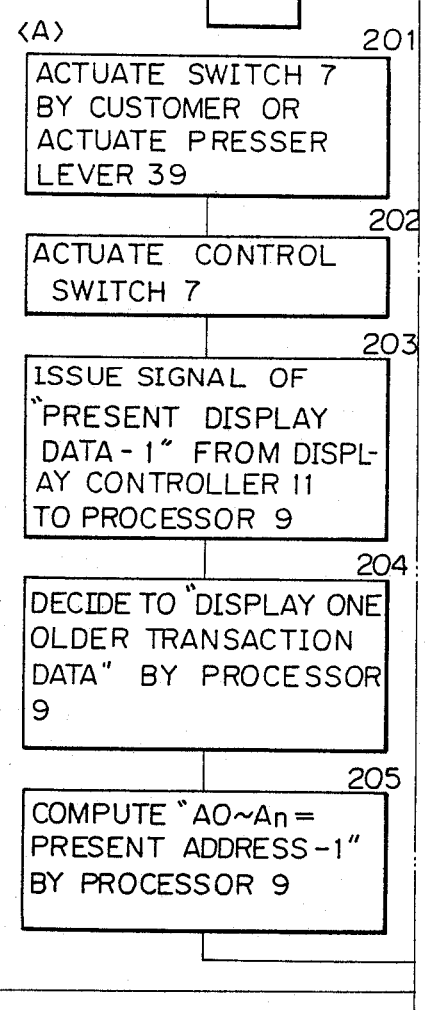
Figure 7B:
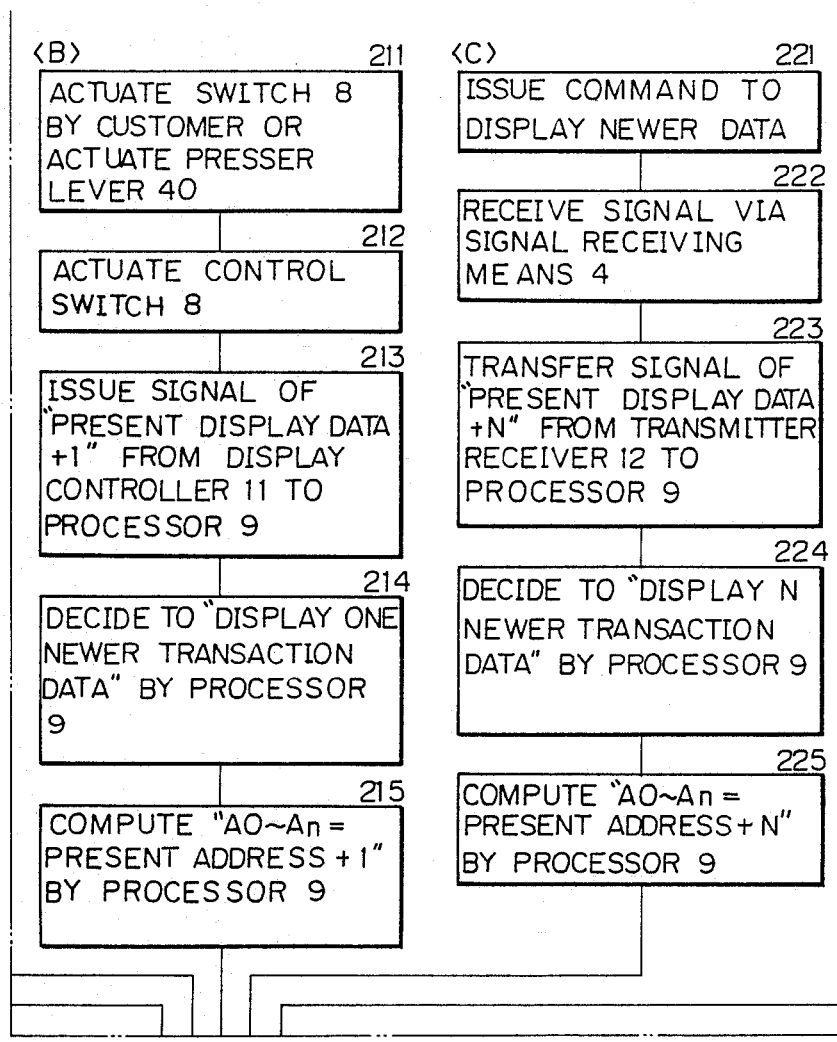
Figure 7C:
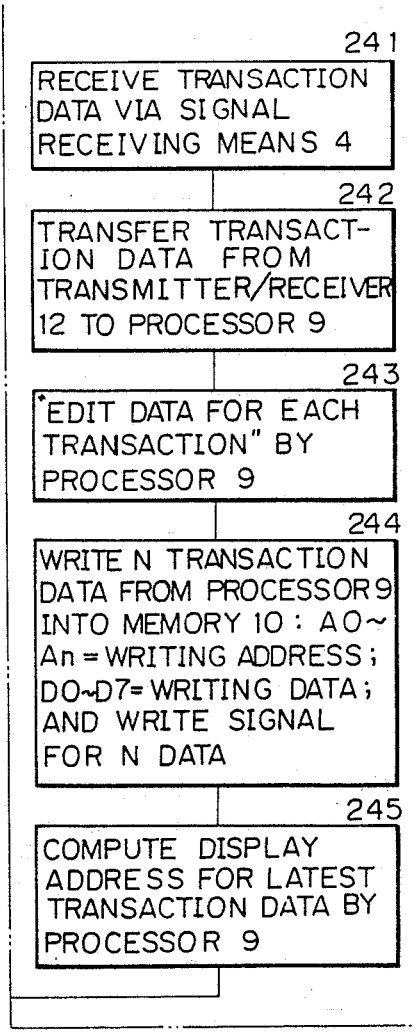
Figure 7D:
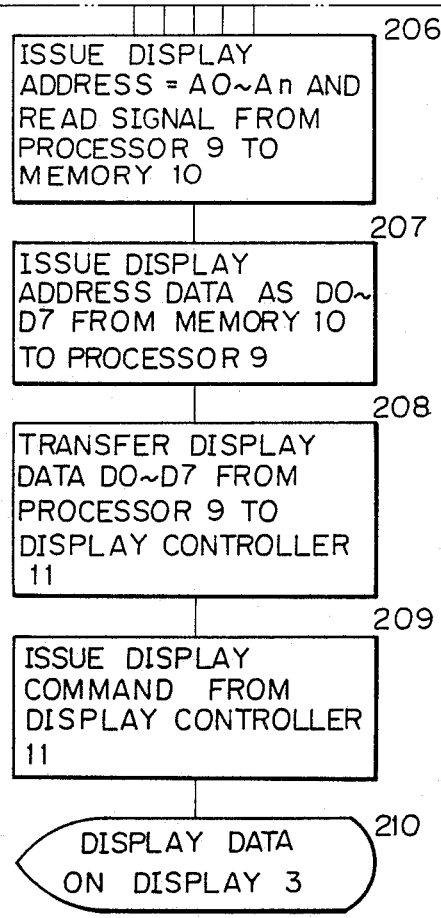

FIG. 6 shows the integrated circuit of an IC card according to another embodiment of the present iknvention, and FIG. 7 illustrates the process of operation of the IC card of FIG. 6.

When the customer is desirous of knowing past transaction details, they can be displayed on the display 3 each time the control switch 7 is depressed. When the customer thereafter wishes to know new transaction details again, the display 3 can be switched to display newer transaction details successively each time the control switch 8 is depressed. Such an operation is shown at (A) and (B) in FIG. 7, and will be described with reference to FIGS. 6 and 7.

When the control switch 7 is pushed by the customer—(A):

When the customer wishes to know one older transaction data through the display 3 of the IC card 1, the customer depresses the control switch 7 once in a step 201. The control switch 7 is actuated in a step 202, and the display controller 11 issues a signal representative of "present displayed data−1" to the processor 9 in a step 203. In response to this signal, the processor 9 decides to "display one older transaction data" in a step 204, and effects the arithmetic operation "display addresses A0~An in the memory 10=present address−1" in a step 205. The present address is the address (indicated by Ax in FIG. 6) in the memory 10 where the transaction data now being displayed is stored. After the arithmetic operation is carried out by the processor 9, the processor 9 delivers the display address=$AO \sim An$ ($Ax-y$) and a readout signal READ to the memory 10 in a step 206. The memory 10 then delivers the transaction data in the indicated display address $Ax-y$ as display data D0~D7 to the processor 9 in a step 207. Having received the display data D0-D7, the processor 9 transfers the display data D0~D7 to the display controller 11 in a step 208. The display controller 11 issues a display command to the display 3 in a step 209, and the display 3 displays preceeding or one older transaction data in a step 210.

When the control switch 8 is pushed by the customer—(B):

When the customer wishes to know one newer transaction data again after he has known past transaction data, i.e., transaction data one newer than the transaction data displayed on the display 3, the customer depresses the control switch 8 once in a step 211. The control switch 8 is actuated in a step 212, and the display controller 11 issues a signal representative of "present displayed data+1" to the processor 9 in a step 213. In response to this signal, the processor 9 decides to "display one newer transaction data" in a step 214, and effects the arithemetic operation "display addresses AO~An=present address+1" in the memory 10 in a step 215. Thereafter, the processor 9 delivers the display address=$AO-An$ ($Ax+y$) and a readout signal READ to the memory 10 in the step 206. The memory 10 then delivers the transaction data in the indicated display address $Ax+y$ as display data D0~D7 to the processor 9 in the step 207. The processor 9 then effects the same operation as described above in the steps 208 through 210.

In the foregoing operation, the data displayed on the display 3 is switched successively by actuating the control switch 7 or 8. However, the data displayed on the display 3 can also be switched successively by actuating the presser lever 39 or 40 in the IC card reader 20 as shown in FIG. 4. More specifically, after the customer inserts the IC card 1 into the card insertion slot 29 and made one desired transaction, the presser lever 40 is actuated once in a step 211 under the control of the IC card reader 20. The display 3 then displays one newer transaction data in the steps 212 through 215 and 206 through 210. By pulling the IC card 1 out of the card insertion slot 29, the customer can know one newer transaction data. Since one newer transaction data is indicated each time one transaction is made, the presser lever 40 should be actuated N times when N transactions are made. Thus, the customer can know the newest transaction data each time he pulls out the IC card 1. It can easily be understood that this operation is the same as that in the steps 131 and 132 in FIG. 5.

The presser lever 39 is controlled to operate once in the step 210 when displaying data one older than the present displayed data. When the presser lever 39 is thus operated, the display 3 display one older transaction data in the steps 202 through 210.

The flows (A), (B) in FIG. 7 are therefore representative of operations for successively switching the data displayed on the display 3, incrementally or decrementally, through the switches 7 and 8.

Display of newer data—(C)

Now, operation for switching the data displayed on the display 3 of the IC card 1 under a command from the IC card reader 20 will be described.

The customer inserts the IC card 1 into the card insertion slot 29 (FIG. 4) and makes a transaction. Although normally one transaction is made at a time, N transactions such as depositing, withdrawing, transferring, recording on the passbook, may be made at one time, and recorded as transaction details in the memory 10 of the IC card 1. At this time, the customer is likely to know the newest transaction data after all of the transactions have been made. Therefore, the display 3 is required to display data which is N times newer than the present displayed data.

The foregoing operation will be described with reference to the flow (C) of FIG. 7.

The IC card reader 20 issues out a command for displaying new data in a step 221. When this command is received by the signal receiving means 4 of the IC card 1 in a step 222, the transmitter/receiver 12 transfers a signal indicative of "present display data+N" to the processor 9 in a step 223. In response to this signal, the preocessor 9 decides to "display N newer transaction data" in a step 224, and effects the arithmetic operation "display addresses AO-An in the memory 10=present address+N" in a step 225. Thereafter, the processor 9 delivers the display address=$AO-An$ in the memory 10=present address+N" in a step 225. Thereafter, the processor 9 delivers the display address=$AO \sim An$ ($Ax+Ny$) and a readout signal READ to the memory 10 in the step 206. The memory 10 then delivers the transaction data in the indicated display address $Ax+Ny$ as display data D0~D7 to the processor 9 in the step 207. The processor 9 then displays "N newer transaction data", i.e., the latest data on the display 3 in the steps 208 through 210.

In the above description, when N transactions are made, the display 3 displays the newest transaction data at all times by displaying the newer transaction data on the display 3. However, the IC card reader 20 may issue a command for displaying the N newer transaction data (where N=1), i.e., one newer transaction data. At any rate, the flow (C) of FIG. 7 is the same as the operation in the steps 124 through 129 in FIG. 5.

Display of older data—(D):

M older transaction data can also be displayed after M transaction have been made. The number M has a meaning different from the number N as above in that M may be a certain number such as 5 or the number of transaction data items back to one month before, or a number specified by the customer with a control switch (not shown). In any case, the IC card reader 20 issues a command for displaying older data in a step 231. When this command is received by the signal receiving means 4 in a step 232, the transmitter/receiver 12 transfers a signal indicative of "present display data—M" to the processor 9 in a step 233. In response to this signal, the processor 9 decides to "display M older transaction data" in a step 234, and effects the arithmetic operation "display addresses AO-An in the memory 10=present address—M" in a step 235. Thereafter, the processor 9 delivers the display address=$AO \sim An$ ($Ax-My$) and a readout signal READ to the memory 10 in the step 206. The memory 10 then delivers the transaction data in the indicated display address $Ax-My$ as display data D0~D7 to the processor 9 in the step 207. The processor 9 then displays "M older transaction data" on the display 3 in the steps 208 through 210. The customer can now know the M older transaction data by pulling his IC card 1 out of the card insertion slot 29.

If there is no display command or the presser levers are not actuated—(E):

The flow (E) of FIG. 7 shows an operation in which there is no display command from the IC card reader 20 or the presser levers 39, 40 are not actuated. In this operation, the IC card reader 20 does not effect the control for the display of newer data (C), the display of older data (D), the actuation of the presser lever 40 (B), and the actuation of the presser lever 39 (A). When the IC card 1 receives transaction data from the IC card reader 20, the received data is written into the memory 10 and displayed under the control of the IC card 1 itself. Therefore, any older data is not displayed, but N transaction data items are written into the memory 10 and displayed on the display 3. As a consequence, the customer can know the latest transaction data by pulling the IC card 1 out of the card insertion slot 29 (FIG. 4).

The operation will be described with reference to the flow (E) of FIG. 7.

When transaction data is received through signal receiving means in a step 241, the transaction data is transferred by the tgransmitter/receiver 12 to the processor 9 in a step 242. The processor 9 then edits the transaction data for each transaction in a step 243. The N transaction data are then written from the processor 9 into the memory 10 in a step 244, the data including AO-An=writing data, and an N data writing signal WRITE. The processor 9 then processes the display address Ax-NY for the latest transaction data among display the N transactgion data. The processor 9 delivers the display address=$AO \sim An$ $(Ax+Ny)$ and a read-out signal READ to the memory 10 in the step 206. The memory 10 then delivers the transaction data in the indicated display address Ax+Ny as display data $D0 \sim D7$ to the processor 9 in the step 207. The processor 9 then displays "N newer transaction data" in the steps 208 through 210 in the same manner as described above. The customer can now know the newest transaction data by pulling the IC card 1 out of the card insertion slot 29.

With the arrangement of the present invention, the IC card having the control switches, the display controller, the display, the transmitter/receiver, the processor, and the memory is controlled by the control switches and the external device or IC card reader for automatically recording data in, reading data from, and displaying data on the IC card. Therefore, the IC card can double as a business treansaction card and a personal identification card, and the customer is not required to carry and store a passbook and slips of transaction details.

Since the automatic cash dispensing and depositing machine incorporating the IC card reader is not required to be equipped with a device for recording data on passbooks and a device for issuing slips of transaction details, the automatic cash dispensing and depositing machine can be smaller in size and less costly to manufacture.

The IC card reader of the present invention has a memory for storing data on effectiveness such as personal identification or various data dependent on different application, so that the data can be retrived for the IC card only. The IC card reader can therefore be widely utilized for reading data from admission checking cards, credit cards, and validation cards.

Although certain preferred embodiments have been shown and described, it should be understood that many changes and modifications may be made therein without departing from the scope of the appended claims.

What is claimed is:

1. An IC card with a display for storing transaction data from a card recording and reading device in combination with the card recording and reading device and for displaying it, comprising:
    (a) a transmitter means and a receiver means respectively connected electrically and optically with a receiver part and a transmitter part of the card recording and reading device;
    (b) a transmitter/receiver part for transmitting and receiving data to and from the card recording and reading device via said transmitter means and said receiver means;
    (c) a processing unit for processing said data;
    (d) a memory part for storing transaction data contained within said data processed in said processing unit in conformity with the development of an associated transaction;
    (e) a display part for displaying one of said transaction data stored in said memory part;
    (f) a first operating switch for sequentially switching the display of the transaction data presently displayed on said display part to that of new transaction data one at a time;
    (g) a second operating switch for sequentially switching the display of the transaction data presently displayed on said display part to the previously transaction data one at a time;
    (h) an operation and display control part for controlling said display part so as to display said transaction data stored in said memory part in conformity with operations of said first operating switch and said second operating switch;
    (i) wherein said data received from the card recording and reading device via said receiver means includes one of either a display instruction to instruct new transaction data to be displayed or a display instruction to instruct the previous transaction data to be displayed; and
    (j) wherein said operation and display control part, upon reception of said display instruction by said transmitter/receiver part, displays and controls said transaction data stored in said memory part, whereby desired data stored in said memory part is displayed on said display part based upon said instruction provided via said transmitter/receiver part or based upon operations of said first and second operating switches.

2. A card recording and reading device for an IC card with a display, said display displaying on the display part one transaction data from among a plurality of transaction data stored in a memory part in conformity with the development of an associated transaction by operation of an operating switch for switching one at a time transaction data presently displayed or an instruction provided via a transmitter/receiver part, said card recording and reading device comprising:
    (a) a transmitter and receiver means for respectively transmitting and receiving data between said transmitter/receiver part of said IC card via a transmitter means and a receiver means provided in said IC card;
    (b) said data including associated transaction data, said transaction data being stored in said memory part of the IC card in conformity with the development of said associated transaction, one of the transaction data stored in said memory part being displayed on the display part; and (c) a push lever for operating an operating switch provided in said IC card for switching said display one at a time.

3. A card recording and reading device for use in an IC card with a display, said display displaying on a display part one transaction data from among a plurality of transaction data stored in a memory part in conformity with the development of an associated transaction by operation of an operating switch for switching one at a time transaction data presently displayed or an instruction provided via a transmitter/receiver part, said card recording and reading device comprising:

(a) a transmitter and receiver means for respectively receiving and transmitting data between said transmitter/receiver part of said IC card via a transmitter means and a receiver means provided in said IC card; and (b) wherein said transmitter and receiver means is adapted to permit said data to include associated transaction data which are stored in said memory part of said IC card in conformity with the development of said associated transaction, one of the transaction data stored in said memory part being displayed on said display part of said IC card, and wherein said transmitter and receiver means is further adapted to transmit an instruction to instruct said display to switch to new transaction data.

* * * * *